Dec. 11, 1951     A. M. SKUDRE     2,577,783
WINDOW MOUNTING
Filed Nov. 1, 1949
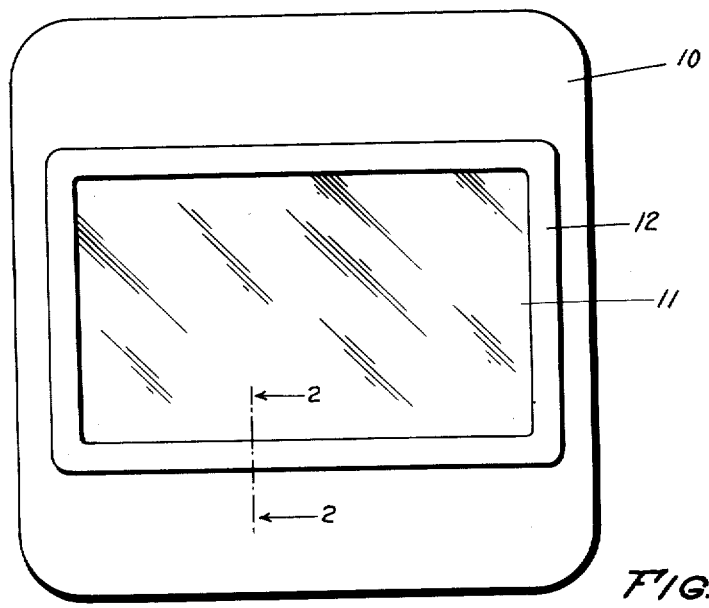
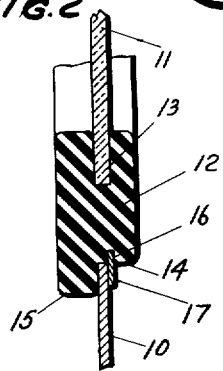
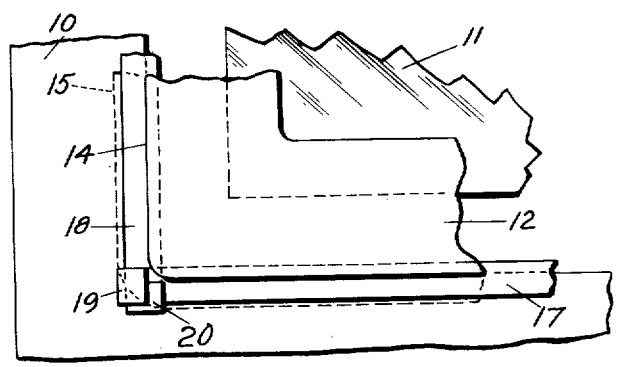
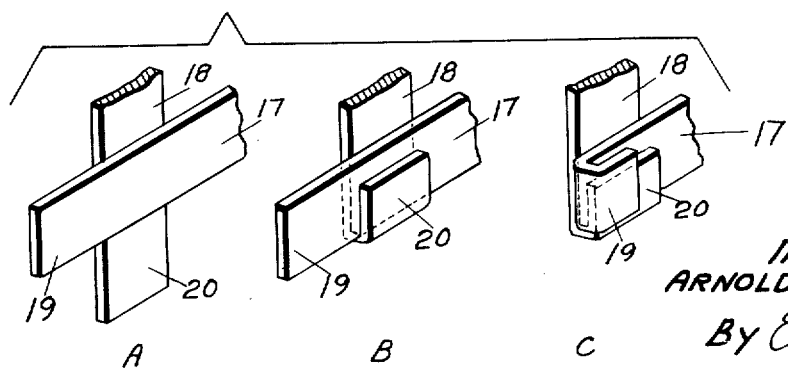
INVENTOR
ARNOLD M. SKUDRE
By Elmer J. Gorn
ATTORNEY Patented Dec. 11, 1951

2,577,783

UNITED STATES PATENT OFFICE 2,577,783

WINDOW MOUNTING

Arnold M. Skudre, Quincy, Mass., assignor to Raytheon Manufacturing Company, Newton, Mass., a corporation of Delaware Application November 1, 1949, Serial No. 124,865

6 Claims. (Cl. 20—56.4)

This invention relates to the mounting of windows in apparatus containing elements which it is desired to view in operation, and more particularly to demountable devices for mounting such windows in a shockproof fashion.

In many forms of apparatus and equipment, for example recording and indicating devices, meters, and the like, an assembly of relatively movable parts is contained in a housing which, for various purposes, may be shockproof, splashproof, or waterproof, or have other similar characteristics. The housing is provided with a window, usually of glass or transparent sheet plastic, which is mounted in one wall thereof. Where shockproof features are desired, the mounting means usually includes a resilient member, made of rubber or the like. In accordance with the present invention, a window is mounted in a wall or partition by means of a resilient grommet-like member. The resilient member embraces the window at its periphery, and fits removably into the wall or partition. It is readily engaged with the window prior to installation in the partition, and easily installed or removed by means of flexible solid strips which engage it about its outer periphery and hold it in place in the wall or partition in cooperation with a flange which is part of the grommet.

Further features and advantages of the invention will become apparent from the detailed description of an embodiment thereof which follows, reference being made to the accompanying drawings wherein:

Fig. 1 is an elevation showing a window mounted in a partition member;

Fig. 2 is a section along line 2—2 of Fig. 1;

Fig. 3 is a detail, greatly enlarged, of the reverse side of Fig. 1; and

Fig. 4 shows in three steps, A, B, and C, the manner of locking the strips shown in Fig. 3.

Referring now to Fig. 1, a partition member 10 is provided with an aperture wherein a window 11 is mounted through the medium of a grommet 12 of rubber or the like. The partition member 10 may be the cover of any meter, indicator, or recording device. Indeed, it may be any wall in which a window is to be mounted. As shown in Fig. 2, the grommet 12 is provided at its inner periphery with a groove 13 into which the window 11 fits. Being made of rubber or the like, the grommet 12 may readily be stretched to a sufficient extent to fit over the peripheral edge of the window 11 and embrace the window, with the window resting throughout its periphery in the main groove 13. Grommet 12 is so dimensioned that the outer periphery 14 thereof fits snugly but removably into the opening in the partition member 10. A flange 15 is provided on the grommet 12, being integral therewith, which extends beyond the periphery 14 in the plane of the partition member 10. When the grommet 12 and window 11 are placed in the opening in the partition member 10, this flange 15 overlies the material of the partition member 10 immediately surrounding the aperture therein. The outer periphery 14 of the grommet 12 is provided also with a second groove 16 which lies generally in the same plane as the inner surface of the partition member 10 when the flange 15 is in contact with the outer surface thereof. A flat locking strip 17 fits into the second groove 16, and is of sufficient size to overlie the inner surface of the partition member 10, thereby locking the grommet and window assembly against removal.

Referring now to Fig. 3, the locking strip 17 is shown along the bottom edge of the grommet 12. A similar locking strip 18 appears along a side edge of the grommet 12. The locking strips 17 and 18 are made sufficiently long so that their ends overlap and each extends beyond the strip material of the other as is shown in Fig. 4A. Thus, the extreme end portion 20 of strip 18 extends beyond the body of strip 17, while the extreme end portion 19 of strip 17 extends beyond the body of strip 18. The interlock of the two ends is formed in two steps, illustrated in Figs. 4B and 4C. As is shown in Fig. 4B, end 20 of strip 18 is bent over the portion of strip 17 immediately within end 19 thereof. As is shown in Fig. 4C, the extreme end portion 19 of strip 17 is then bent over the extreme end portion 20 of strip 18.

The lock which is formed as described above involves operations which can all be carried out on one side only of the partition member 10 when the grommet and window assembly is inserted in the aperture thereof. The strips 17 and 18 are duplicated at the top edge and the remaining side edge of the grommet 12, and all four corners are interlocked as shown in Fig. 4, and described above. The strips are made of a solid material which is flexible enough to form the lock, at the same time retaining sufficient flexibility to permit reversal of the forming operations so that the window may be removed if desired, or so that the locking strip assembly may be taken apart and used again to permit the insertion of a new window in the event of breakage of the original window. The arrangement of the present invention permits the mounting of a window in a case or housing at an extremely low cost and with a minimum of time consumption.

Since many modifications and variations of the invention different from the single embodiment illustrated and described herein will occur to those skilled in the art to which the invention relates, it is intended that the claims shall be limited, not by the particular details of the embodiment described herein, but by the prior art.

What is claimed is:

1. Means for mounting a first piece of sheet material in an aperture in a second piece of sheet material, where the aperture is of the same shape and larger than said first piece comprising a resilient member adapted perimetrically to embrace said first piece and having a first groove wherein said first piece fits, the outer boundary of said member being freely but snugly fittable into said aperture when said member embraces said first piece, an outwardly directed flange on said member adapted to overlie on one face the material of said second piece immediately surrounding said aperture, and a second groove in said outer boundary disposed to lie substantially flush with the remaining face of said second piece when said flange is in contact with said one face, a plurality of flat elongated strips of solid material dimensioned to be engageable within said second groove and simultaneously overlie said remaining face, said strips being disposed with their flat sides parallel to the same plane on the same side of said second piece of sheet material, and each two adjacent strips having their long dimensions at an angle and crossing each other in a region near an end of each, the end material beyond said region of the strip nearer to said second piece of sheet material being bent away from said second piece and over the body of the adjacent crossing strip in a plane parallel to said plane, and the end material of the adjacent crossing strip being similarly bent away from said second piece and over the body of said bent-over end material of said strip nearer to said second piece to overlie said first bent-over end so that said strips are interlocked each with its neighbors to form a continuous locking strip around said second groove.

2. Means for mounting a first piece of sheet material in an aperture in a second piece of sheet material, where the aperture is of the same shape and larger than said first piece comprising a resilient member adapted perimetrically to embrace said first piece and having a first groove wherein said first piece fits, the outer boundary of said member being freely but snugly fittable into said aperture when said member embraces said first piece, an outwardly directed flange on said member adapted to overlie on one face the material of said second piece immediately surrounding said aperture, and a second groove in said outer boundary disposed to lie substantially flush with the remaining face of said second piece when said flange is in contact with said one face, a plurality of flat elongated strips of solid material dimensioned to be engageable within said second groove and simultaneously overlie said remaining face, said strips being engaged in said second groove successively thereabout with adjacent strip ends overlapping, each pair of such ends being disposed with their flat sides parallel to the same plane on the same side of said second piece of sheet material, and each two adjacent strips having their long dimensions at an angle and crossing each other in a region near an end of each, the end material beyond said region of the strip nearer to said second piece of sheet material being bent away from said second piece and over the body of the adjacent crossing strip in a plane parallel to said plane, and the end material of the adjacent crossing strip being similarly bent away from said second piece and over the body of said bent-over end material of said strip nearer to said second piece to overlie said first bent-over end so that said strips are interlocked to retain said strips in said second groove.

3. Means for mounting a first piece of sheet material in an aperture in a second piece of sheet material, where the aperture is of the same shape and larger than said first piece comprising a resilient member adapted perimetrically to embrace said first piece and having a first groove wherein said first piece fits, the outer boundary of said member being freely but snugly fittable into said aperture when said member embraces said first piece, an outwardly directed flange on said member adapted to overlie on one face the material of said second piece immediately surrounding said aperture, and a second groove in said outer boundary disposed to lie substantially flush with the remaining face of said second piece when said flange is in contact with said one face, a plurality of flat elongated strips of flexible solid material dimensioned to be engageable within said second groove and simultaneously overlie said remaining face, said strips all having their flat sides parallel to the same plane and to said second piece of sheet material, and being engaged in said second groove successively thereabout with adjacent strip ends overlapping and extending beyond each other, each pair of such ends being interlocked with the free end of the lower strip closer to said second piece of sheet material bent up and over the upper strip further removed from said second piece, at a region inside the free end thereof, the free end of the upper strip bent up and over the bent-over free end of the lower strip, said bent-over ends all lying parallel to said second piece and to said strips.

4. Means for mounting a first piece of sheet material in an aperture in a second piece of sheet material, where the aperture is of the same shape and larger than said first piece comprising a resilient member adapted perimetrically to embrace said first piece and having a first groove wherein said first piece fits, the outer boundary of said member being freely but snugly fittable into said aperture when said member embraces said first piece, an outwardly directed flange on said member adapted to overlie on one face the material of said second piece immediately surrounding said aperture, and a second groove in said outer boundary disposed to lie substantially flush with the remaining face of said second piece when said flange is in contact with said one face, a plurality of flat elongated strips of flexible solid material dimensioned to be engageable within said second groove and simultaneously overlie said remaining face, said strips all having their flat sides parallel to the same plane and to said second piece of sheet material, and being engaged in said second groove successively thereabout with the ends of adjacent strips overlapping each other, one strip end embracing a portion of the other overlapped strip immediately within the extreme end portion thereof in the direction away from said second piece of sheet material, and said extreme end portion embracing said one strip end in said same direction.

5. In combination, a partition member having a rectangular aperture therein, a rectangular window of smaller size than and similar shape to said aperture, a resilient member adapted perimetrically to embrace said window, said resilient member having a first groove wherein said window fits and being snugly fittable at its outer periphery within said aperture when embracing said window, an outwardly directed flange on said resilient member adapted to overlie on one face the material of said partition member immediately surrounding said aperture, a second groove in said outer periphery disposed to lie substantially flush with the remaining face of said partition member when said flange is in contact with said one face, and means engageable within said second groove and dimensioned to overlie said remaining face when so engaged for detachably securing said window in said aperture, said securing means comprising four strips of solid flat elongated strip material of which two are somewhat longer than the long sides of said aperture and two are somewhat longer than the short sides thereof, the strips all lying with their flat sides parallel to the plane of said partition member and being engaged in corresponding sides of said resilient member with adjacent ends overlapping and interlocked with each other, the end of the strip nearer to said partition member being bent away from said partition member to overlie the other strip, and the end of said other strip being bent away from said partition member to overlie said first-named end.

6. The arrangement in accordance with claim 3 wherein one strip end of an adjacent pair of ends embraces the body of the other strip immediately within the extreme end portion of said other strip and said extreme end portion embraces said one strip end.

ARNOLD M. SKUDRE.

REFERENCES CITED

The following references are of record in the file of this patent:

UNITED STATES PATENTS

| Number | Name | Date |
|---|---|---|
| 820,896 | Van Patten | May 15, 1906 |
| 1,005,404 | Abraham | Oct. 10, 1911 |
| 2,255,725 | Trescher | Sept. 9, 1941 |
| 2,288,329 | Smith | June 30, 1942 |

Patent No. 2,577,783     Certificate of Correction

ARNOLD M. SKUDRE     December 11, 1951

It is hereby certified that error appears in the printed specification of the above numbered patent requiring correction as follows:

Column 6, line 10, for the claim reference numeral "3" read *5*; and that the said Letters Patent should be read as corrected above, so that the same may conform to the record of the case in the Patent Office.

Signed and sealed this 18th day of March, A. D. 1952.

[SEAL]

THOMAS F. MURPHY,
*Assistant Commissioner of Patents.*